F. LOTTER.
VEHICLE TIRE.
APPLICATION FILED JULY 24, 1916.
1,207,185.
Patented Dec. 5, 1916.
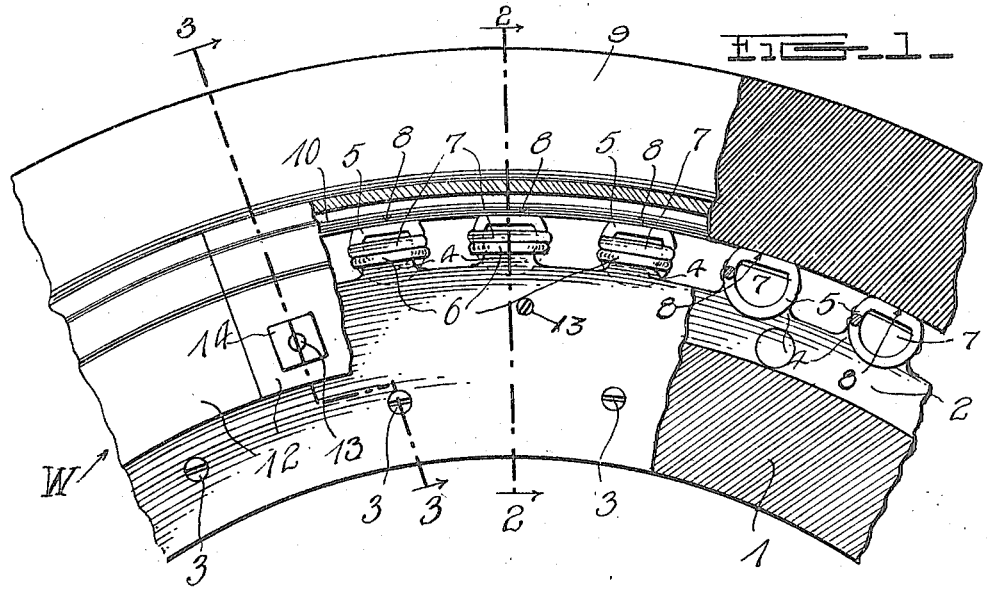
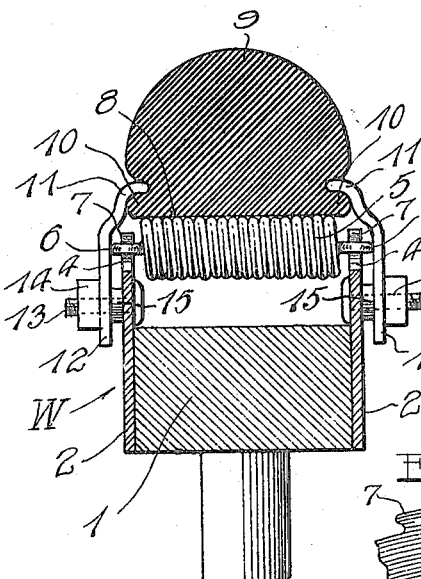
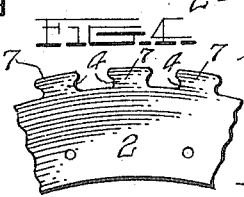
Witness
George W. Givrangetti
Inventor
Franklin Lotter
By H. R. Willson & Co.
Attorneys

UNITED STATES PATENT OFFICE.

FRANKLIN LOTTER, OF ELKTON, MICHIGAN.

VEHICLE-TIRE.

1,207,185. Specification of Letters Patent. Patented Dec. 5, 1916.

Application filed July 24, 1916. Serial No. 111,023.

*To all whom it may concern:*

Be it known that I, FRANKLIN LOTTER, a citizen of the United States, residing at Elkton, in the county of Huron and State of Michigan, have invented certain new and useful Improvements in Vehicle-Tires; and I do declare the following to be a full, clear, and exact description of the invention, such as will enable others skilled in the art to which it appertains to make and use the same.

This invention relates to improvements in vehicle tires in which resiliency is obtained by means of suspended members disposed at intervals around the tire.

The principal object of the invention is to produce a device of this character having a new and improved arrangement and combination of parts whereby a more efficient structure is formed.

A secondary object is to provide an improved means for suspending the resilient members so as to obtain the greatest amount of benefit therefrom.

With these and other objects in view, my invention resides in the novel features of construction, combinatin and arrangement of parts as will hereinafter be more fully described and claimed.

In the accompanying drawings: Figure 1 is a side elevation of a portion of the vehicle tire mounted upon a portion of a wheel, the parts of each being in section; Figs. 2 and 3 are transverse sections taken respectively on the lines 2—2 and 3—3 of Fig. 1; and Fig. 4 is a detail side elevation of a portion of one of the spring suspending plates.

Referring more particularly to these several figures of the drawings in which similar numerals of reference designate corresponding parts, 1 denotes a wooden felly of an ordinary vehicle wheel W, said felly being preferably provided with flat sides so that the structure which will be presently described, can be readily attached thereto. To each of these flat sides is secured an annular plate 2 which is of a width somewhat greater than the thickness of said felly, and therefore projects beyond the periphery of the latter. These plates are secured to the felly by any suitable means such as screws 3. On the periphery of each of the plates 2 is formed a plurality of radially extending ears 4 which project outwardly therefrom. These ears are formed at predetermined points on the plates and those on one plate are transversely alined with the ears on the other. These ears are adapted to support resilient members in the form of coiled springs 5, these springs being disposed transversely of the tread of a wheel, and one is provided for each alined pair of ears. On the opposite ends of each of the springs 5 is formed eyes 6 which are of such size that they will readily spring over the enlarged outer ends 7 of the ears 4. The enlarged portions 7 of the ears retain the springs in position until a tire is placed therearound. It will be noted that the springs 5 are spaced from the periphery of the felly a distance of about one-half inch more or less. It is obvious that any preferred number of the former may be used depending upon the size and weight of the vehicle upon which the wheels are to be used.

The outer portion of each spring 5 is flattened as shown at 8 so as to form a substantially flat periphery for the reception of the flat inner portion of the solid rubber tire 9. The tire 9 is provided on each side with a retaining bead 10 as is usual in solid tires of this construction, and in the present instance these beads are engaged by the hooked ends 11 of a plurality of arcuate tire retaining plates 12. I have shown these attaching plates as formed of a number of arcuate sections although it is obvious that one continuous annular plate might well be provided for each side of the tire.

The preferred means for attaching the retaining plates 12 consists in fixing a plurality of outwardly projecting threaded studs 13 to the plates 2 beyond the periphery of the felly 1. Apertures are formed in the plates 12 for the reception of the studs 13, and when they are in position nuts 14 are threaded on the latter. Before placing the plates 12 in position, however, spacing washers 15 are disposed on the studs 13. It will be seen from the several figures of the drawings that shocks which are received by the rubber tire 9 will be effectively absorbed by the suspended springs 5, thereby greatly relieving the vehicle springs of excessive vibration. The space between the inner portions of the springs 5 and the periphery of the felly 1 permit a considerable inward movement on the part of the tire 9 before the said springs engage the wheel. In fact such engagement will only take place under very unusual shocks received by the tire.

I claim as my invention:

1. In a device of the class described, a vehicle wheel, a pair of annular plates, one secured to each side of the felly of said wheel and extending beyond the periphery thereof, a plurality of outwardly extending undercut ears formed on the outer edges of said plates, said ears being transversely alined, a plurality of transversely extending springs, an eye formed on each end of each spring, said eyes being secured in the undercut portions of said ears, and a tire disposed around said springs and in engagement therewith.

2. In a device of the class described, a vehicle wheel, a pair of annular plates, one secured to each side of the felly of said wheel and extending beyond the periphery thereof, a plurality of radially extending ears formed on the periphery of each of said plates, a plurality of transversely extending springs, an eye formed on each end of each spring, said eyes being disposed over said ears, threaded studs projecting outwardly from said plates beyond the periphery of said wheel, a tire disposed around said springs in engagement therewith, a plurality of arcuate hooked tire retaining plates disposed on said studs, the hooked portions of the plates engaging said tire on opposite sides thereof, and retaining nuts on said threaded studs.

In testimony whereof I have hereunto set my hand in the presence of two subscribing witnesses.

FRANKLIN LOTTER.

Witnesses:
W. L. DOYLE,
F. E. DOYLE.

Copies of this patent may be obtained for five cents each, by addressing the "Commissioner of Patents, Washington, D. C."